(12) United States Patent
Waki et al.

(10) Patent No.: US 7,066,978 B2
(45) Date of Patent: *Jun. 27, 2006

(54) NANOPARTICLE, METHOD OF PRODUCING NANOPARTICLE AND MAGNETIC RECORDING MEDIUM

(75) Inventors: Koukichi Waki, Kanagawa (JP); Yasushi Hattori, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 99 days.

This patent is subject to a terminal disclaimer.

(21) Appl. No.: 10/367,873

(22) Filed: Feb. 19, 2003

(65) Prior Publication Data

US 2004/0013907 A1    Jan. 22, 2004

(30) Foreign Application Priority Data

Feb. 18, 2002 (JP) ............................. 2002-039957
Jul. 19, 2002 (JP) ............................. 2002-211154

(51) Int. Cl.
*B22F 9/24* (2006.01)

(52) U.S. Cl. .......................................... 75/348; 75/371

(58) Field of Classification Search ................ 715/348, 715/350, 370, 371
See application file for complete search history.

(56) References Cited

U.S. PATENT DOCUMENTS

| | | | |
|---|---|---|---|
| 5,695,901 A * | 12/1997 | Selim ..................... | 430/106.2 |
| 6,413,489 B1 * | 7/2002 | Ying et al. ................. | 423/600 |
| 6,572,673 B1 * | 6/2003 | Lee et al. ................... | 75/362 |
| 6,676,729 B1 * | 1/2004 | Sun ............................ | 75/348 |
| 6,773,823 B1 * | 8/2004 | O'Connor et al. .......... | 428/548 |
| 2004/0166166 A1* | 8/2004 | Matsunami et al. ........ | 424/490 |

FOREIGN PATENT DOCUMENTS

| | | |
|---|---|---|
| JP | 49-130864 A | 12/1974 |
| JP | 06-151133 A | 5/1994 |
| JP | 08-143916 A | 4/1996 |
| WO | 02/062509 A1 | 8/2002 |

OTHER PUBLICATIONS

Kumbhara A et al.: "Magnetic Properties of Colbal and Colbalt-Platinum Alloy Manoparticles Synthesized via Microemulsion Technique", IEEE Transactions on Magnetics, IEEE Inc., vol. 37, No. 4, Part 1, Jul. 7, 2001, pp. 2216-2218.

Wu M-L et al:, "Preparation of Au/Pt Bimetallix Manoparticles in Water-in-Oil Microemulsions" Chemistry Of Materials, American Chemical Society, vol. 13, no. 2, Feb. 1, 2001, pp. 599-606.

Lin J et al:, "Formation of ordered arrays of gold nanoparticles from CTAB reverse micelles", Materials Letters, North Holland Publishing Company , vol. 49, No. 5, Jul. 2001, pp. 282-286.

Office Action dated Nov. 8, 2005, Japanese Application No. 2002-039957.

Shouhen Sun, "Monodisperse FePt Nanoparticles and Ferromagnetic FePt Nanocrystal Superlattices" Science, vol. 287, Mar. 17, 2000, pp. 1989-1992.

European Official Communication dated Mar. 10, 2005.

Official Action, Japanese Patent Office, App. 2002-211154, dated Mar. 7, 2006.

* cited by examiner

*Primary Examiner*—Gerorge Wyszomierski
(74) *Attorney, Agent, or Firm*—Sughrue Mion, PLLC

(57) ABSTRACT

A method of producing a nanoparticle, the method comprising: a reducing step of adding an reverse micelle solution (II) obtained by mixing a water-insoluble organic solvent containing a surfactant with an aqueous metal salt solution to an reverse micelle solution (I) obtained by mixing a water-insoluble organic solvent containing a surfactant with an aqueous reducing agent solution, to carry out a reducing reaction; and a maturing step of raising the temperature of the reduced mixture to mature the reduced mixture is provided. A method of producing a plural type alloy nanoparticle, the method comprising producing a nanoparticle made of a plural type alloy through a reducing step of mixing one or more reverse micelle solutions (I) containing a metal salt with an reverse micelle solution (II) containing a reducing agent to carry out reducing treatment and a maturing step of carrying out maturing treatment is also provided.

13 Claims, No Drawings

NANOPARTICLE, METHOD OF PRODUCING NANOPARTICLE AND MAGNETIC RECORDING MEDIUM

BACKGROUND OF THE INVENTION

1. Field of the Invention

The present invention relates to a nanoparticle, a method of producing a nanoparticle, and a magnetic recording medium.

2. Description of the Related Art

In order to increase magnetic recording density, it is necessary to decrease the particle size of magnetic bodies contained in a magnetic layer. In magnetic recording media used widely in videotapes, computer tapes, disks, and the like, noise decreases with the decrease in particle size when the mass of the ferromagnetic body is the same.

CuAu type or $Cu_3Au$ type hard magnetic regular alloys have large crystal magnetic anisotropy because of distortion caused when regulated so that they exhibit hard magnetic characteristics even if they are reduced in particle size and put in a nanoparticle state. Therefore, these alloys are promising materials for improving magnetic recording density.

Examples of methods for synthesizing nanoparticles capable of forming these CuAu type or $Cu_3Au$ type alloys when classified by precipitation method include (1) an alcohol reduction method using a primary alcohol; (2) a polyol reduction method using a secondary, tertiary, divalent or trivalent alcohol; (3) a heat decomposition method; (4) an ultrasonic decomposition method; and (5) a strong reducing agent reduction method.

Also, when classified by a reaction system, methods for synthesizing nanoparticles include (6) a polymer existence method; (7) a high-boiling point solvent method; (8) a regular micelle method; and (9) an reverse micelle method.

The alcohol reduction method (1) has poor reduction ability. Therefore, when reducing a precious metal and a base metal at the same time, it is hard to form a uniform alloy and many alloys end up having a core/shell structure. In the case of the polyol reduction method (2) and the heat decomposition method (3), a high-temperature reaction is required and these methods are therefore inferior in production aptitude. The ultrasonic decomposition method (4) and the strong reducing agent reduction method (5) are relatively simple methods. However, in these methods, coagulation and precipitation tend to be caused and it is therefore difficult to obtain a small monodispersible particle without implementing a special technique in the reaction system.

There is also an ethanol reduction method using polyvinylpyrrolidone, in which the above-mentioned methods (1) and (6) are combined. In this case, the amount of polymers after synthesis is very large and is difficult to decrease to the required amount.

For a system in which methods (2), (3) and (7) are combined, those described in Japanese Patent Application Laid-Open (JP-A) No. 2000-54012 and U.S. Pat. No. 6,254, 662 are known. This method is, however, very hazardous because highly toxic substances are used. Also, in these methods, it is necessary to run a reaction in inert gas and at a temperature as high as nearly 300° C., hence these methods have the drawback that the apparatuses used are complicated and thus inferior from the standpoint of production aptitude.

Methods using a system combining methods (5) and (8) and a system combining methods (5) and (9) are common methods. However, detailed conditions and the like as to a method for obtaining metal nanoparticles having the intended composition and particle size have yet to be found.

The nanoparticles synthesized in the above methods have a face centered cubic crystal structure. The face-centered cubic crystal usually exhibits soft magnetism or paramagnetism These nanoparticles exhibiting soft magnetism or paramagnetism are not adaptable to recording media. In order to obtain a hard magnetic regular alloy having a coercive force of 95.5 kA/m (1200 Oe) or more, which is necessary for magnetic recording media, annealing treatment must be carried out at a temperature higher than the transformation temperature at which the alloy is transformed from an irregular phase to a regular phase.

However, when the nanoparticle produced in the above methods is applied to a support, followed by annealing treatment to produce a magnetic recording medium, these nanoparticles tend to coagulate easily with each other leading to reduced coatability and deteriorated magnetic characteristics. It is also difficult to form a perfect regular phase even if heat treatment is performed because the particle diameter of the resulting nanoparticle is uneven and therefore, there are cases where the desired hard magnetism is not obtained.

Also, the transformation temperature is generally as high as 500° C. or more and an organic support, which is commonly used, does not possess adequate heat resistance. It is therefore difficult to form a magnetic film by applying a nanoparticle to the organic support, followed by carrying out annealing treatment.

SUMMARY OF THE INVENTION

In this situation, it is an object of the present invention to provide nanoparticles which are not easily coagulated with each other, have high coatability and of which the particle size and composition can be controlled and also to provide a method of producing the nanoparticle. Also, another object of the invention to provide a magnetic recording medium which contains the above nanoparticle in a magnetic layer and exhibits hard magnetism.

The inventors of the invention have made earnest studies to solve the above problem and, as a result, found that the above problem can be solved by the following invention. Accordingly, the first embodiment of the invention provides a method of producing a nanoparticle, the method comprising a reducing step of adding an reverse micelle solution (II) obtained by mixing a water-insoluble organic solvent containing a surfactant with an aqueous metal salt solution to an reverse micelle solution (I) obtained by mixing a water-insoluble organic solvent containing a surfactant with an aqueous reducing agent solution, to carry out a reducing reaction and a maturing step of raising the temperature of the system to mature the system after the reducing reaction is finished, wherein the ratio (water/surfactant) by mass of water to the surfactant in each of the reverse micelle solution (I) and the reverse micelle solution (II) is 20 or less; the reducing reaction temperature is constant in a range from −5 to 30° C.; and the maturing temperature is higher than the reducing reaction temperature and is constant in a range from 30 to 90° C. and the maturing time is 5 to 180 minutes.

Further, from the above point view, it is an object of the present invention to provide a method of producing a plural type alloy nanoparticle which has a low transformation temperature, is scarcely coagulated, has superior coatability, has also a controllable particle size and composition and can exhibit ferromagnetism in a high yield.

Thus, the second embodiment of the invention resides in a method of producing a plural type nanoparticle, the method comprising producing a nanoparticle made of a plural type alloy through a reducing step of mixing one or more reverse micelle solutions (I) containing a metal salt with an reverse micelle solution (II) containing a reducing agent to carry out reducing treatment and a maturing step of carrying out maturing treatment after the reducing treatment, wherein at least two metals constituting the plural type alloy are selected from the VIb group and VIII group in the periodic table; and at least one metal constituting the plural type alloy is selected from the Ib group, IIIa group, IVa group and Va group and the content of the selected metal is 1 to 30 at. % in all of the plural type alloy.

In the case where at least two metals constituting the plural type alloy are selected from the VIb group or VIII group in the periodic table in order to develop ferromagnetism and hard magnetism, it is preferable that a CuAu type or $Cu_3Au$ type alloy be formed of these metals.

The methods of embodiments 1 and 2 preferably further comprise a washing/dispersing step of washing the matured solution by a mixed solution of water and a primary alcohol after the maturing step is finished, then carrying out precipitating-treatment by using a primary alcohol to produce a precipitate and dispersing the precipitate by using an organic solvent.

Further, at least one dispersant having 1 to 3 amino groups or carboxyl groups is preferably added to at least any one of the reverse micelle solutions (I) and (II) in an amount of 0.001 to 10 mol per one mol of the metal nanoparticle intended to be produced.

Also, the invention provides a nanoparticle produced by the aforementioned method of producing a nanoparticle.

Further, the invention provides a magnetic recording medium comprising a magnetic layer formed on a support, wherein; the magnetic layer is formed by applying a dispersion solution in which the aforementioned nanoparticle is dispersed to the support and performing annealing treatment.

DETAILED DESCRIPTION OF THE PREFERRED EMBODIMENTS

Method of Producing Nanoparticles

A method of producing a nanoparticle according to the present invention comprises a reducing step of mixing at least two reverse micelle solutions to run a reducing reaction and a maturing step of maturing the resulting solution at a predetermined temperature after the reducing reaction is finished. Specifically, the method of producing a nanoparticle according to the embodiment 2 of the present invention comprises a reducing step of mixing one or more reverse micelle solutions (I) containing a metal salt with an inverse solution (II) containing a reducing agent to carry out reducing treatment and a mating step of carrying out maturing treatment after the reducing treatment. A plural type alloy nanoparticle (hereinafter referred to simply as "nanoparticle" as the case may be) is produced by the above production method.

Each step will be explained hereinbelow.

Reducing Step

First, a water-insoluble organic solvent containing a surfactant is mixed with an aqueous reducing agent solution to prepare an reverse micelle solution (I).

As the surfactant, an oil-soluble surfactant is used. Specific examples of the oil-soluble surfactant include sulfonate types (e.g., Aerosol OT (manufactured by Wako Pure Chemical Industries, Ltd.), quaternary ammonium salt types (e.g., cetyltrimethylammonium bromide), and ether types (e.g., pentaethylene glycol dodecyl ether).

The water-insoluble organic solvent used to dissolve the foregoing surfactant is alkanes and ethers. The alkanes are preferably those having 7 to 12 carbon atoms. Specifically, heptane, octane, nonane, decane, undecane and dodecane are preferable. The ethers are preferably diethyl ether, dipropyl ether and dibutyl ether.

The amount of the surfactant in the water-insoluble organic solvent is preferably 20 to 200 g/l.

As the reducing agent in the aqueous reducing agent solution, alcohols; polyalcohols; $H_2$; compounds containing HCHO, $S_2O_6^{2-}$, $H_2PO_2^-$, $BH_4^-$, $N_2H_5^+$, $H_2PO_3^-$ and the like may be used either singly or in combinations of two or more.

The amount of the reducing agent in the aqueous solution is preferably 3 to 50 mol based on one mol of the metal salt.

Here, the ratio (water/surfactant) by mass of water to the surfactant in the reverse micelle solution (I) is designed to be 20 or less. When the mass ratio exceeds 20, such a problem arises that precipitation tends to be caused and the particles tend to be uneven. The ratio by mass is preferably 15 or less and more preferably 0.5 to 10.

Besides the above micelle solution (I), an reverse micelle solution (II) is prepared which is obtained by mixing a water-insoluble organic solvent containing a surfactant with an aqueous metal salt solution of the first embodiment of the invention.

The conditions (e.g., materials to be used and concentration) of the surfactant and water-insoluble organic solvent are the same as those used for the micelle solution (I). It is to be noted that either the same type or different types as that of the reverse micelle solution (I) may be used. Also, the ratio by mass of water to the surfactant in the reverse micelle solution (II) is the same as that in the reverse micelle solution (I) and may be the same as or different from that in the reverse micelle solution (I).

In the second embodiment of the invention, a water-insoluble organic solvent containing a surfactant is firstly mixed with an aqueous metal salt solution to prepare an inverse solution (I). The reverse micelle solution (I) may contain plural metal salts which are used to produce a plural type alloy. Also, these metal salts may be made to be contained in separate solutions, which may be respectively prepared as reverse micelle solutions (I).

For example, an reverse micelle solution ($I_a$) containing metals selected from the VIb group and VIII group and an reverse micelle solution ($I_b$) containing metals selected from the Ib group, IIIa group, IVa group and Va group may be separately prepared and mixed optionally.

As the metal salt to be contained in the aqueous metal salt solution of the first embodiment and the second embodiment of the invention, a metal salt selected arbitrarily from nitrates, sulfates, chlorides, acetates, acetylacetonates, hydroacids of metal complexes using a chlorine ion as a ligand, potassium salts of metal complexes using a chlorine ion as a ligand, sodium salts of metal complexes using a chlorine ion as a ligand, ammonium salts of metal complexes using an oxalic acid ion as a ligand may be used.

Also, as the metals, at least two types are selected from the VIb group and VIII group and at least one type is selected from the Ib group, ma group, IVa group and Va group.

A nanoparticle capable of exhibiting hard magnetism is produced by using metals selected from the VIb group and VIII group. Also, the use of metals selected from the Ib group, IIIa group, IVa group and Va group makes it possible to lower the phase transformation temperature at which the hard magnetism of the nanoparticle is developed. As a consequence, the necessity for considering the heat resistance of a support and the like is thus obviated when it is intended to produce a magnetic recording medium or the like by using the nanoparticle and it is therefore possible to form a magnetic layer containing the nanoparticle on a support made of an organic material in an efficient manner.

In the first embodiment and the second embodiment of the invention, examples of a binary and a ternary alloy composition constituted of the VIb group and VIII group, namely, CuAu type or $Cu_3Au$ type ferromagnetic regular alloy include FePt, FePd, FeNi, CoPt, CoPd, CoAu, CoCrPt, CoCrPd, FeNiPt, FeCoPt, $Ni_3Fe$, $FePd_3$, $Fe_3Pt$, $FePt_3$, $CoPt_3$, $Ni_3Pt$, and $CrPt_3$.

The other element selected from the Ib group, IIIa group, IVa group and Va group and contained to produce the plural type alloy is preferably selected from Cu, Ag, B, In, Sn, Pb, P, Sb and Bi. The amount (content) of the element selected from the Ib group, IIIa group, IVa group and Va group is designed to be 1 to 30 at. % and preferably 5 to 20 at. % based on all the plural type alloy.

If the amount is less than 1 at. %, the effect of dropping the transformation temperature is decreased and the addition has no significance. If the amount exceeds 30 at. %, a regular phase in which the crystal structure of the nanoparticle has hard magnetism after annealing treatment cannot be formed eventually.

It is to be noted that the plural type alloy is preferably constituted of a total of 3 to 5 elements including the two elements selected from the VIb group and VIII group and one element selected from the Ib group, IIIa group, IVa group and Va group.

The concentration (as metal salt concentration) of each element in the aqueous metal salt solution is preferably 0.1 to 2000 μmol/ml and more preferably 1 to 500 μmol/ml.

It is preferable to add a chelating agent to the aqueous metal salt solution to make each resulting particle have an even composition. The chelate stability constant (log K) is preferably 10 or less. Specifically, it is preferable to use, for example, DHEG (dihydroxyethylglycine), IDA (iminodiacetic acid), NTP (nitrilotripropionic acid), HIDA (dihydroxyethyliminodiacetic acid), EDDP (ethylenediaminedipropionic acid dihydrochloride), BAPTA (tetrapotassium diaminophenylethylene glycol tetraacetate hydride) or the like.

The amount of the chelating agent is preferably 0.1 to 10 mol and more preferably 0.3 to 3 mol per one mol of the metal salt.

Next, in the second embodiment of the invention, a water-insoluble organic solvent containing a surfactant is mixed with an aqueous reducing agent solution to prepare an reverse micelle solution (II). When two or more reducing agents are used, these reducing agents may be mixed together to prepare an inverse solution (II). However, it is desirable that these reducing agents be preferably mixed separately with a water-insoluble organic solvent to prepare separate reverse micelle solutions ($II_a$), ($II_b$), ($II_c$) etc., and these solutions be used by mixing arbitrarily taking, for example, solution stability and operability into account.

The conditions (e.g., materials to be used and concentration) of the surfactant, water-insoluble organic solvent, and reducing agent are the same as those used for the micelle solution (I) of the first embodiment of the invention.

The ratios by mass of water to the surfactant in the reverse micelle solutions (I) and (II) may be the same or different; however, the ratios are preferably the same to make the system uniform.

In both of the first and the second embodiments of the invention, the prepared reverse micelle solutions (I) and (II) are mixed with each other in the above manner. Although there is no particular limitation to a mixing method, it is preferable to mix the both by adding the reverse micelle solution (II) to the reverse micelle solution (I) with stirring the reverse micelle solution (I) taking reduction uniformity into account. After the mixing is finished, a reducing reaction is made to run. At this time, the temperature is made to be constant in a range from −5 to 30° C.

When the reducing temperature is less than −5° C., such a problem that the water phase is congealed, causing an uneven reducing reaction. When the reducing temperature exceeds 30° C., coagulation or precipitation tends to be caused, making the system unstable. The reducing temperature is preferably 0 to 25° C. and more preferably 5 to 25° C.

Here, the foregoing term "constant temperature" mess that when the set temperature is T (° C.), the temperature T falls in a range of T±3° C. It is to be noted that even in the case of setting the constant temperature in this manner, the upper limit and lower limit of T fall in the above reducing temperature range (−5 to 30° C.).

Although it is necessary to set the reducing reaction time appropriately according to the amount of the reverse micelle solution and the like, the reaction time is preferably 1 to 30 minutes and more preferably 5 to 20 minutes.

Because the reducing reaction greatly affects the monodispersibility of the distribution of particle diameter, it is preferable to run the reducing reaction with stirring at a rate as high as possible (for example, at about 3,000 rpm or faster).

A preferable stirring apparatus is a stirrer having high shearing force and is specifically a stirrer having a structure in which the stirring blade basically has a turbine type or paddle type structure, also a sharp edge is attached to a position where it is in contact with the end of the blade or with the blade and the blade is rotated using a motor. Specifically, as the stirrer, a dissolver (manufactured by Tokushu Kika Kogyo Co., Ltd.), Omni Mixer (manufactured by Yamato Scientific Co., Ltd.) and homogenizer (manufactured by SMT) are useful. The use of each of these apparatuses makes it possible to synthesize a monodispersible nanoparticle in the form of a dispersion solution.

It is preferable to add at least one dispersant having 1 to 3 amino groups or carboxyl groups to at least any one of the above micelle solutions (I) and (II) in an amount of 0.001 to 10 mol per 1 mol of the metal nanoparticle to be produced.

The addition of such a dispersant ensures that a nanoparticle which is more improved in monodispersibility and is fee from coagulation can be obtained.

When the amount of the dispersant is less than 0.001, there is the case where the monodispersibility of the nanoparticle cannot be more improved, whereas when the amount exceeds 10 mol, there is the case where coagulation arises.

As the aforementioned dispersant, organic compounds having a group which adsorbs to the surface of the metal nanoparticle are preferable. Specific examples of the dispersant include organic compounds having 1 to 3 amino groups, carboxy groups, sulfonic acid groups or sulfinic acid groups. These organic compounds may be used either singly or in combinations of two or more.

These examples are compounds having the structural formulae represented by R—NH$_2$, NH$_2$—R—NH$_2$, NH$_2$—R(NH$_2$)—NH$_2$, R—COOH, COOH—R—COOH, COOH—R(COOH)—COOH, R—SO$_3$H, SO$_3$H—R—SO$_3$H, SO$_3$H—R(SO$_3$H)—SO$_3$H, R—SO$_2$H, SO$_2$H—R—SO$_2$H and SO$_2$H—R(SO$_2$H)—SO$_2$H, wherein R represents a straight-chain, branched or cyclic saturated or unsaturated hydrocarbon.

A compound particularly preferable as the dispersant is oleic acid. Oleic acid is a surfactant known in point of stabilizing a colloid and has been used to protect an iron nanoparticle. Oleic acid is provided with a relatively long chain (for example, oleic acid has 18 carbon chains and a length of 20 angstroms (2 nm) or more and is not an aliphatic compound but has one double bond) which provides an important steric hindrance which offsets a strong interaction between particles.

Like oleic acid, long-chain carboxylic acids such as erucic acid and linoleic acid are used (for example, long-chain organic acids having 8 to 22 carbon atoms may be used either singly or in combinations of two or more). Oleic acid (e.g., olive oil) is an easily available and inexpensive natural resource and is therefore preferable. Also, like oleic acid, oleylamine derived from oleic acid is a useful dispersant.

It is considered that in the above reducing step, metals, such as Co, Fe, Ni and Cr, of which the redox potential is on a lower level (metals whose redox potential is the order of −0.2 V or less (vs. N. H. E)) in the CuAu type or Cu$_3$Au type hard magnetic regular alloy phase are reduced and precipitated in a micro-sized and monodispersed state. Thereafter, in a stage of raising temperature or in a maturing step which will be described later, the precipitated base metal serves as a nucleus, on the surface of which metals, such as Pt, Pd and Rh, of which the redox potential is on a higher level (metals whose redox potential is the order of −0.2 V or more (vs. N. H. E)) are reduced by the base metal, substituted and precipitated. It is considered that the ionized base metal is rereduced by a reducing agent and precipitated. Such a process is repeated to obtain a nanoparticle capable of forming a CuAu type or Cu$_3$Au type hard magnetic regular alloy.

Maturing Step

After the reducing reaction is finished, the solution after the reaction is raised to maturing temperature.

Although the maturing temperature is preferably set to a constant temperature in a range from 30 to 90° C., its temperature is made to be higher than the temperature used in the reducing reaction. Also, the maturing time is preferably set to 5 to 180 minutes. When the maturing temperature and time are shifted to the high-temperature and long-time side, coagulation and precipitation tend to be caused. When, on the contrary, the maturing temperature and time are shifted to the low-temperature and short-time side, the reaction is not completed, causing a change in composition. The maturing temperature and time are preferably 40 to 80° C. and 10 to 150 minutes and more preferably 40 to 70° C. and 20 to 120 minutes respectively.

Here, the aforementioned term "constant temperature" has the same meanings as in the case of the temperature in the reducing reaction (provided that the "reducing temperature" is changed to the "maturing temperature"). Particularly, the maturing temperature is higher than the aforementioned temperature used in the reducing reaction by preferably 5° C. or more and more preferably 10° C. or more within the aforementioned maturing temperature range (30 to 90° C.). When a difference in temperature between the both is less than 5° C., there is the case where a composition according to the formulation is not obtained.

In the maturing step as aforementioned, a precious metal is precipitated on the base metal which has been reduced and precipitated in the reducing step. Namely, the precious metal is reduced only on the base metal and therefore the base metal and the precious metal are not precipitated separately. It is therefore possible to produce a nanoparticle, capable of efficiently forming a CuAu type or Cu$_3$Au type hard magnetic regular alloy, in a high yield according to the formulated percentage composition, whereby the nanoparticle can be controlled so as to have a desired composition. Also, the resulting nanoparticle can be made to have a desired particle diameter by appropriately regulating stirring speed at the temperature in the maturing.

It is preferable to provide a washing/dispersing step in which after the above maturing is carried out the matured solution is washed using a mixed solution of water and a primary alcohol and then, precipitation treatment is carried out using a pi alcohol to produce a precipitate, which is then dispersed using an organic solvent.

The provision of such a washing step ensures that impurities are removed to thereby improve the coatability exhibited when forming the magnetic layer of the magnetic recording medium by application.

The aforementioned washing and dispersion are respectively carried out at least once and preferably twice or more.

Although there is no particular limitation to the aforementioned primary alcohol used in the washing step, methanol, ethanol or the like is preferable. The ratio by volume of (water/primary alcohol) is preferably in a range from 10/1 to 2/1 and more preferably in a range from 5/1 to 3/1.

If the ratio of water is high, there is the case where the surfactant is removed with difficulty, whereas if the ratio of the primary alcohol is high, there is the case where coagulation takes place.

A nanoparticle dispersed in a solution is obtained in the above manner. These nanoparticles are monodispersible. Therefore, even if these particles are applied to a support, these particle are not coagulated but kept in a uniformly dispersed state. These nanoparticles are not coagulated with each other even if annealing treatment is carried out and can be therefore hard-magnetized efficiently, showing that these nanoparticles have high coatability.

The particle diameter of the nanoparticle before annealed is preferably 1 to 20 nm and more preferably 3 to 10 nm. When the nanoparticles are used for a magnetic recording medium, it is preferable that the nanoparticles be closely packed with the view of increasing recording capacity. For this, the coefficient of variation of the metal nanoparticles of the invention is preferably less than 15% and more preferably 8% or less. If the particle size of the nanoparticle is excessively small, the nanoparticle has superparamagnetism because of thermal fluctuation and such a size is undesirable. Although the minimum stable particle diameter differs depending on the structural elements, it is effective to change the ratio by mass of H$_2$O/surfactant in the synthesis of the nanoparticle to obtain a necessary particle diameter.

In the evaluation of the particle diameter of the nanoparticle of the invention, a transmission type electron microscope (TEM) may be used. Although electron beam diffraction using TEM may be utilized to determine the crystal type of nanoparticle which is hard-magnetized by heating, it is preferable to use X-ray analysis to make evaluation with high accuracy. It is preferable that an FE-TEM capable of finely contracting electron beams be equipped with an EDAX to make evaluation for the analysis of the composition inside of the hard-magnetized nanoparticle. A VSM may be used to evaluate the magnetic qualities of the hard-magnetized nanoparticle.

The coercive force of the nanoparticle after annealed is preferably 95.5 to 1193.8 kA/m (1200 to 15000 Oe) and more preferably 95.5 to 398 kA/m (1200 to 5000 Oe) from the viewpoint that when the nanoparticle is applied to the magnetic recording medium, a recording head can respond to this.

Although a method of heating the nanoparticles to a temperature higher than the transformation temperature is optional, it is preferable to heat after the nanoparticles are applied to a support to avoid the fusion of these nanoparticles.

In the case of heating after the nanoparticles are applied to an organic support having a low heat resistance, it is preferable to use a pulse laser.

Because the nanoparticle obtained by the production method of the second embodiment of the present invention specifically has a low trans formation temperature, it can also be used for an organic support having low heat-resistance. In this case, if a pulse laser is used as means for heating to the transformation temperature, the deterioration and deformation of the organic support caused by heat can be prevented more efficiently.

The hard-magnetized nanoparticle is preferably used in videotapes, computer tapes, floppy (R) disks and hard disks. It is also preferably applied to MRAMs.

Magnetic Recording Medium

The magnetic recording medium of the invention comprises at least a magnetic layer formed on a support and the magnetic layer contains the nanoparticle obtained by the production method of the invention. The magnetic layer is formed by applying a coating solution, in which the nanoparticle is dispersed, to the support, followed by annealing treatment. Also, the magnetic recording medium comprises other layers if necessary.

Namely, the magnetic recording medium of the invention comprises the magnetic layer containing the nanoparticle on the surface of the support and also provided with a nonmagnetic layer between the magnetic layer and the support if necessary. In the case of a disk, a magnetic layer is likewise formed or a magnetic layer and a nonmagnetic layer if necessary on the opposite side of the support. In the case of a tape, for example, a back coat layer is formed on the side opposite to the magnetic layer on the support.

A method of producing a magnetic recording medium in which the nanoparticle obtained by the production method of the invention is preferably used will be hereinafter explained in detail and the magnetic recording medium of the invention will be explained in detail through the production method.

As the coating solution in which the nanoparticle is dispersed, the solution containing the nanoparticle obtained in the aforementioned method of producing the nanoparticle may be used. In actual, it is preferable to add known additives and various solvents to the coating solution containing the nanoparticle to thereby adjust the content of the nanoparticle to a desired one (0.01 to 0.1 mg/ml).

The coating solution is applied to the support to form a lower coating layer or a magnetic layer. In the production of the magnetic recording medium of the invention, for example, the foregoing coating solution is applied to the surface of the support such that the layer thickness of the magnetic layer after dried is within a range preferably from 5 nm to 200 nm and more preferably from 5 nm to 100 nm.

Here, plural coating solutions may be applied one after another or simultaneously to form a multilayer.

As a method of applying the coating solution, air doctor coating, blade coating, rod coating, extrusion coating, air knife coating, squeeze coating, impregnation coating, reverse roil coating, transfer roll coating, gravure coating, kiss coating, cast coating, spray coating and spin coating may be utilized.

As the support, any of inorganic materials and organic materials may be used. As the support of an inorganic material, Al, an Al—Mg alloy, a Mg alloy such as a Mg—Al—Zn alloy, glass, quartz, carbon, silicon and ceramics may be used. Supports made of these materials have high impact resistance and also rigidity coping with an improvement in a tier support and with high rotation. Also, these supports have the characteristics that they are stronger than organic supports against heat.

Polyesters such as polyethylene terephthalate and polyethylene naphthalate, polyolefins, cellulose triacetate, polycarbonates, polyamides (including aliphatic polyamides and aromatic polyamides such as alamide), polyimides, polyamidoimides, polysulfones and polybenzoxazole may be used for the support of an organic material.

The nanoparticles prior to annealing treatment has an irregular phase. In order to obtain a regular phase, it is necessary to carry out annealing treatment. In the annealing treatment, the substrate is preferably heated after the coating operation to avoid the fusion of the particles. As to heating temperature, the regular-irregular transformation temperature of the alloy constituting the nanoparticles is found using differential thermal analysis (DTA) to carry out the annealing treatment at temperatures higher than the transformation temperature.

It is to be noted that the transformation temperature is changed according to the elemental composition or by the introduction of third elements.

In the case of using a support made of an organic material, it is effective to use a nanoparticle having a transformation temperature lower than the heat-resistant temperature of the support or to heat only the magnetic layer by using a pulse laser.

Although as the wavelength of a laser in the case of using a pulse laser, a wavelength ranging from the ultraviolet region to the infrared region may be used, laser light having a wavelength ranging from the visible region to the infrared region is preferably used because the organic support has absorption in the ultraviolet region.

The power of the laser is preferably 0.1 W or more and more preferably 0.3 W or more because the coating layer is heated in a short time. When the power is excessively high, there is the case where the organic support is affected by heat. Therefore, the power is preferably 3 W or less.

Examples of a laser which is preferably used include an Ar ion laser, Cu vapor laser, HF chemical laser, dye laser, ruby laser, YAG laser, glass Laser, titanium sapphire laser, alexandrite laser and GaAlAs array semiconductor laser from the viewpoint of the wavelength of the laser and output.

The linear velocity when scanning laser light is preferably 1 to 10 m/s and more preferably 2 to 5 m/s to obtain such an effect that the laser light causes sufficient annealing but causes no abrasion.

It is effective to improve wear resistance by forming a very thin protective layer on the magnetic layer and further a lubricant is applied thereon to thereby improve lubricity, thereby securing full reliability.

Examples of the protective layer include those comprising oxides such as silica, alumina, titania, zirconia, cobalt oxide and nickel oxide; nitrides such as titanium nitride, silicon nitride and boron nitride; carbides such as silicon carbide, chromium carbide and boron carbide; and carbons such as graphite and amorphous carbon. Among these materials, a carbon protective layer made of carbon is preferable. A carbon protective layer made of hard amorphous carbon generically called diamond-like carbon is particularly preferable.

As a method of producing a carbon protective layer, a sputtering method is generally used in the case of a hard disk. Many methods using plasma CVD having a high filming rate are proposed in the case of products, such as videotapes, which need continuous filming. It is reported that among these methods, a plasma injection CVD (PI-CVD) method has a very high filming rate and as a carbon protective layer to be obtained, a hard and high quality protective layer reduced in pinholes is obtained (e.g., JP-A Nos. 61-130487, 63-279426 and 3-113824).

The carbon protective layer is a hard carbon layer having a Vickers hardness of 1000 $Kg/mm^2$ or more and preferably 2000 $Kg/mm^2$ or more. Also, the crystal structure of the carbon protective layer is an amorphous structure and is nonconductive. In the case of using a diamond-like carbon layer is used as the carbon protective layer, the structure of the carbon layer can be confirmed by detecting a peak at 1520 to 1560 $cm^{-1}$ when measuring the structure by Raman light spectral analysis. When the layer structure is deviated from a diamond-like structure, the peak detected by Raman light spectral analysis is deviated from the above range and also the hardness of the layer is decreased.

As raw materials used to produce the carbon protective layer, carbon-containing compounds including alkanes such as methane, ethane, propane and butane; alkenes such as ethylene and propylene; and alkines such as acetylene may be used. Also, a carrier gas such as argon and addition gases such as hydrogen and nitrogen for improving layer quality may be added if necessary.

When the layer thickness of the carbon protective layer is high, this brings about deteriorated electromagnetic transformation characteristics and a reduction in adhesiveness to the magnetic layer, whereas when the layer thickness is low, this brings about a lack of wear resistance. Therefore, the layer thickness is preferably 2.5 to 20 nm and more preferably 5 to 10 nm. Also, in order to improve adhesion between this hard carbon protective layer and the ferromagnetic metal thin layer which is to be the support, the surface of the ferromagnetic metal thin layer may be etched in advance by inert gas or exposed to a plasma of reactive gas such as oxygen to reform the surface.

The magnetic layer may be made to have a multilayer structure to improve electromagnetic transformation characteristics or may be provided with a nonmagnetic base layer or an intermediate layer.

In the magnetic recording medium of the invention, it is preferable to provide a lubricant and a rust preventive agent to the surface of the magnetic layer or to the surface of the protective layer to improve running durability and corrosion resistance. As the lubricant to be added, known hydrocarbon type lubricants, fluorine type lubricants and extreme-pressure type additives may be used.

Examples of the hydrocarbon type lubricant include carboxylic acids such as stearic acid and oleic acid; esters such as butyl stearate; sulfonates such as octadecylsulfonic acid; phosphates such as monooctadecyl phosphate; alcohols such as stearyl alcohol and oleyl alcohol; carboxylic acid amides such as stearic acid amide; and amines such as stearylamine.

Examples of the fluorine type lubricant include lubricants obtained by substituting a fluroalkyl group or a perfluoropolyether group for a part or all of the alkyl group of the aforementioned hydrocarbon type lubricant.

Examples of the perfluoropolyether group include perfluoromethylene oxide polymers, perfluoroethylene oxide polymers, perfluoro-n-propylene oxide polymers $(CF_2CF_2CF_2O)_n$, perfluoroisopropylene oxide polymers (CF $(CF_3)CF_2O)_n$ or copolymers of these compounds. Also, compounds having an polar functional group such as a hydroxyl group, ester group or carboxyl group at the terminal or inside thereof have a high effect on a reduction in fictional force and are therefore preferable. The molecular weight of each of these compounds is preferably 500 to 5000 and more preferably 1000 to 3000. If the molecular weight less than the above range, there is the case where the volatility becomes high and the lubricity is deteriorated. Also, if the molecular weight exceeds the above range, the viscosity is increased and therefore a slider and a disk tend to be stuck to each other, causing an operation to be suspended and head crush.

Specific examples of the lubricant substituted with perfluoropolyether include commercially available products under the name of FOMBLIN from Auzimond and under the name of KRYTOX from Du Pont K.K.

Examples of the extreme-pressure type additive include phosphates such as trilauryl phosphate, phosphites such as trilauryl phosphite, thiophosphites such as trilauryl trithiophosphite, thiophosphates and sulfur type extreme-pressure agents such as dibenzyl disulfide.

The above lubricants may be used either singly or in combinations of two or more. As to a method of providing these lubricants to the magnetic layer or the protective layer, each of these lubricants may be dissolved in an organic solvent and the resulting solution may be applied by a wire bar method, gravure method, spin coating method or dip coating method or deposited by a vacuum deposition method.

Examples of the rust preventive agent include nitrogen-containing heterocyclic compounds such as benzotriazole, benzimidazole, purine and pyrimidine and derivatives obtained by introducing an alkyl side chain or the like into each mother nucleus of these heterocyclic compounds, benzothiazole, 2-mercaptobenzothiazole, tetrazaindene cyclic compounds and nitrogen- and sulfur-containing heterocyclic compounds such as thiouracyl compounds and their derivatives.

In the case of providing a back coat layer (backing layer) to the surface of the support which is used in the invention and on which surface no magnetic layer is formed, the back coat layer may be formed by applying a back coat layer-forming paint obtained by dispersing particulate components, such as an abrasive material and an antistatic agent and a binder in an organic solvent, on the surface of the support on which surface no magnetic layer is formed.

As the particulate components, various inorganic pigments and carbon black may be used. Also, as the binder, resins such as nitrocellulose, phenoxy resins, vinyl chloride type resins and polyurethane resins may be used either singly or by mixing these resins.

It is to be noted that an adhesive layer may be formed on the surface of the support to which surface the dispersion solution of the nanoparticle and the back coat layer-forming paint is applied.

As a magnetic recording medium for high-density recording, the magnetic recording medium of the invention preferably has such a very high smoothness that the center line average roughness of the surface is in a range from 0.1 to 5 nm and preferably 1 to 4 nm at a cutoff value of 0.25 mm. In order to make such a surface, it is preferable to carry out calendering treatment after the magnetic layer is applied. Also, burnish treatment may be carried out.

The resulting magnetic recording medium may be used after it is punched by a punching machine or cut down to a desired size by a cutter.

EXAMPLES

The present invention will be explained in detail by way of examples, which, however, are not intended to be limiting of the invention. Examples according to the first embodiment of the invention:

Example 1-1

The following operations were carried out in high purity $N_2$ gas.

An alkane solution obtained by mixing 10.8 g of Aerosol OT (manufactured by Wako Purr Chemical Industries, Ltd.), 80 ml of decane (manufactured by Wako Pure Chemical Industries, Ltd.) and 2 ml of oleylamine (manufactured by Tokyo Kasei Kogyo Co., Ltd.) was added to and mixed with an aqueous reducing agent solution obtained by dissolving 0.76 g of $NaBH_4$ (manufactured by Wako Pure Chemical Industries, Ltd.) in 16 ml of water (deoxidized: 0.1 mg/l or less) to prepare an reverse micelle solution (I).

An alkane solution obtained by mixing 5.4 g of Aerosol OT and 40 ml of decane was added to and mixed with an aqueous metal salt solution obtained by dissolving 0.46 g of triammonium iron trioxalate ($Fe(NH_4)_3(C_2O_4)_3$) (manufactured by Wako Pure Chemical Industries, Ltd.) and 0.38 g of potassium chloroplatinate ($K_2PtCl_4$) (manufactured by Wako Pure Chemical Industries, Ltd.) in 8 ml of water (deoxidized) to prepare an reverse micelle solution (II).

The reverse micelle solution (E) was added in an instant to the reverse micelle solution (I) with stirring the reverse micelle solution (I) at 22° C. by using an Omni Mixer (manufactured by Yamato Scientific Co., Ltd.). After ten minutes, the mixture was raised to 50° C. with stirring by a magnetic stirrer and then matured for 60 minutes.

2 ml of oleic acid (manufactured by Wako Pure Chemical Industries, Ltd.) was added to the mixture, which was then cooled to ambient temperature. After cooled, the m was taken out in the atmosphere. In order to destroy reverse micelles, a mixed solution consisting of 100 ml of water and 100 ml of methanol was added to the mixture to separate a water phase from an oil phase. Such a state that nanoparticles were dispersed was obtained in the oil phase side. The oil phase side was washed with a mixed solution consisting of 600 ml of $H_2O$ and 200 ml of methanol five times.

Thereafter, 1100 ml of methanol was added to the resulting solution to cause flocculation of the nanoparticles to thereby precipitate. The supernatant was removed and 20 ml of heptane (manufactured by Wako Pure Chemical Industries, Ltd.) was added to redisperse.

Further, the precipitating operation performed by the addition of 100 ml of methanol and the dispersing operation using 20 ml of heptane were repeated three times and finally, 5 ml of heptane was added to the resulting solution to prepare a FePt nanoparticle dispersion solution in which the ratio (water/surfactant) by mass of water to a surfactant was 2.

The yield, composition, volume average particle diameter and its distribution (coefficient of variation) and coercive force of the resulting nanoparticles were measured. The results as shown below were obtained.

It is to be noted that the composition and the yield were measured by ICP spectral analysis (inductive coupling high-frequency plasma spectral analysis).

The volume average particle diameter and the distribution were found by measuring particles on a TEM photograph, followed by statistical processing.

The coercive force was measured using a high-sensitive magnetization vector measuring device and a DATA processor manufactured by Toei Industry Co., Ltd. in the condition of an applied magnetic field of 790 kA/m (10 kOe). As the nanoparticles to be subjected to measurement, nanoparticles obtained after nanoparticles were collected from the prepared nanoparticle dispersion solution, thoroughly dried and heated in an electric furnace were used.

Composition: FePt alloy with 44.5 at % of Pt, yield: 85%

Average particle diameter: 4.2 nm, coefficient of variation: 5%

Coercive force (550° C. electric furnace, after heated 30 minutes). 576.7 kA/m (7300 Oe)

Example 1-2

A FePt nanoparticle dispersion solution in which the ratio (water/surfactant) by mass of water to a surfactant was 5 was prepared in the same manner as in Example 1-1 except that the amount of water in the reverse micelle solution (I) was altered to 40 ml and the amount of water in the reverse micelle solution (II) was altered to 20 ml.

The yield, composition, volume average particle diameter and its distribution (coefficient of variation) and coercive force of the resulting nanoparticles were measured in the same manner as in Example 1-1. The results are shown below.

Composition: FePt alloy with 45.0 at % of Pt, yield: 88%

Volume average particle diameter: 5.8 nm, coefficient of variation: 4%

Coercive force (550° C. electric furnace, after heated 30 minutes): 521.4 kA/m (6600 Oe)

Example 1-3

A FePt nanoparticle dispersion solution in which the ratio (water/surfactant) by mass of water to a surfactant was 8 was prepared in the same manner as in Example 1-1 except that the amount of water in the reverse micelle solution (I) was altered to 64 ml and the amount of water in the reverse micelle solution (II) was altered to 32 ml.

The yield, composition, volume average particle diameter and its distribution (coefficient of variation) and coercive force of the resulting nanoparticles were measured in the same manner as in Example 1-1. The results are shown below.

Composition: FePt alloy with 44.8 at % of Pt, yield: 82%

Volume average particle diameter: 7.6 nm, coefficient of variation: 4%

Coercive force (550° C. electric furnace, after heated 30 minutes): 417.8 kA/m (5300 Oe)

Example 1-4

The following operations were carried out in high purity $N_2$ gas.

An ether solution obtained by mixing 10.8 g of Aerosol OT (manufactured by Wako Pure Chemical Industries, Ltd.), 80 ml of dibutyl ether (manufactured by Wako Pure Chemical Industries, Ltd.) and 2 ml of oleylamine (manufactured by Tokyo Kasei Kogyo Co., Ltd.) was added to and mixed with an aqueous reducing agent solution obtained by dissolving 0.57 g of $NaBH_4$ (manufactured by Wako Pure Chemical Industries, Ltd.) in 16 ml of water (deoxidized: 0.1 mg/l or less) to prepare an reverse micelle solution (I).

An ether solution obtained by mixing 5.4 g of Aerosol OT and 40 ml of dibutyl ether was added to and mixed with an aqueous metal salt solution obtained by dissolving 0.46 g of triammonium iron trioxalate $(Fe(NH_4)_3(C_2O_4)_3)$ (manufactured by Wako Pure Chemical Industries, Ltd.) and 0.32 g of sodium chloropalladate $(Na_2PdCl_4 \cdot 3H_2O)$ (manufactured by Wako Pure Chemical Industries, Ltd.) in 8 ml of water (deoxidized) to prepare an reverse micelle solution (II).

The reverse micelle solution (II) was added in an instant to the reverse micelle solution (I) with stirring the reverse micelle solution (I) at 22° C. by using an Omni Mixer (manufactured by Yamato Scientific Co., Ltd.). After ten minutes, the mixture was raised to 50° C. with stirring by a magnetic stirrer and then matured for 60 minutes.

2 ml of oleic acid (manufactured by Wako Pure Chemical Industries, Ltd.) was added to the mixture, which was then cooled to ambient temperature. After cooled, the mixture was taken out in the atmosphere. In order to destroy reverse micelles, a mixed solution consisting of 100 ml of water and 100 ml of methanol was added to the mixture to separate a water phase from an oil phase. Such a state that nanoparticles were dispersed was obtained in the oil phase side. The oil phase side was washed with a mixed solution consisting of 600 ml of $H_2O$ and 200 ml of methanol five times.

Thereafter, 1100 ml of methanol was added to the resulting solution to cause flocculation of the nanoparticles to thereby precipitate. The supernatant was removed and 20 ml of heptane (manufactured by Wako Pure Chemical Industries, Ltd.) was added to redisperse.

Further, the precipitating operation performed by the addition of 100 ml of methanol and the dispersing operation using 20 ml of heptane were repeated three times and finally, 5 ml of heptane was added to the resulting solution to prepare a FePd nanoparticle dispersion solution.

The yield, composition, volume average particle diameter and its distribution (coefficient of variation) and coercive force of the resulting nanoparticles were measured in the same manner as in Example 1-1. The results are shown below.

Composition: FePd alloy with 45.2 at % of Pd, yield: 83%
Volume average particle diameter: 5.6 nm, coefficient of variation: 4%
Coercive force (550° C. electric furnace, after heated 30 minutes): 331.8 kA/m (4200 Oe)

Example 1-5

A FePtCu nanoparticle dispersion solution was prepared in the same manner as in Example 1-1 except that an alkane solution obtained by mixing 5.4 g of Aerosol OT and 40 ml of decane was added to and mixed with an aqueous metal salt solution obtained by dissolving 0.39 g of triammonium iron trioxalate $(Fe(NH_4)_3(C_2O_4)_3)$ (manufactured by Wako Pure Chemical Industries, ltd.), 0.32 g of potassium chloroplatinate $(K_2PtCl_4)$ (manufactured by Wako Pure Chemical Industries, Ltd.) and 0.08 g of diammonium copper chloride $(Cu(NH_4)_2Cl_4 \cdot 2H_2O)$ (manufactured by Wako Pure Chemical Industries, Ltd.) in 8 ml of water (deoxidized) to prepare an reverse micelle solution (II).

The yield, composition, volume average particle diameter and its distribution (coefficient of variation) and coercive force of the resulting nanoparticles were measured in the same manner as in Example 1-1. The results are shown below.

Composition: FePtCu alloy with 38.5 at % of Pt and 14.6 at % of Cu, yield: 88%
Volume average particle diameter: 4.4 nm, coefficient of variation: 5%
Coercive force (250° C. electric furnace, after heated 30 minutes): 371.3 kA/m (4700 Oe)
Coercive force (550° C. electric Furnace, after heated 30 minutes): 497.7 kA/m (6300 Oe)

Comparative Example 1-1

A FePt nanoparticle dispersion solution was prepared in the same manner as in Example 1-1 except that the reverse micelle solution (I) was mixed with the reverse micelle solution (II) at ambient temperature (about 25° C.), the reducing reaction was run with stirring using a magnetic stirrer and the reaction mixture was matured at the same temperature (25° C.) for 120 minutes.

The yield, composition, volume average particle diameter and its distribution (coefficient of variation) and coercive force of the resulting nanoparticles were measured in the same manner as in Example 1-1. The results are shown below.

Composition: FePt alloy with 23.1 at % of Pt, yield: 25%
Volume average particle diameter: 3.9 nm, coefficient of variation: 33%
Coercive force (550° C. electric furnace, after heated 30 minutes): 49.77 kA/m (630 Oe)

Comparative Example 1-2

A FePt nanoparticle dispersion solution was prepared in the same manner as in Example 1-1 except that the reverse micelle solution (I) was reacted with the reverse micelle solution (B) at 60° C. with sting using a magnetic stirrer and the reaction mixture was matured at the same temperature for 20 minutes.

The yield, composition, volume average particle diameter and its distribution (coefficient of variation) and coercive force of the resulting nanoparticles were measured in the same manner as in Example 1-1. The results are shown below.

Composition: FePt alloy with 52.0 at % of Pt. yield: 19%
Volume average particle diameter: 4.8 nm, coefficient of variation: 41%
Coercive force (550° C. electric furnace, after heated 30 minutes): 120.08 kA/m (1520 Oe)

Comparative Example 1-3

A FePt nanoparticle dispersion solution was prepared in the same, manner as in Example 1-1 except that a reducing reaction was run between the reverse micelle solution (I) and the reverse micelle solution (II) at ambient temperature (about 25° C.) with stirring using a magnetic stirrer such that the ratio by mass of water to a surfactant was 30 and after 10 minutes, the reaction mixture was matured at 50° C. for 60 minutes.

The yield, composition, volume average particle diameter and its distribution (coefficient of variation) and coercive force of the resulting nanoparticles were measured in the same manner as in Example 1-1. The results are shown below.

Composition, FePt alloy with 47.2 at % of Pt, yield: 45%
Volume average particle diameter: 4.1 nm, coefficient of variation: 30%
Coercive force (550° C. electric furnace, after heated 30 minutes): 153.26 kA/m (1940 Oe)

In the case of the aforementioned nanoparticles of Examples 1 to 5 as compared with Comparative Examples 1 to 3, compositions close to those according to the formulation were obtained in a high yield. It was also clarified that the nanoparticles of Examples 1 to 5 had such superiority that these nanoparticles were reduced in the coefficient of variation as to the distribution of particle diameter, showing that they were monodispersions and had a high coercive force after heated.

The nanoparticle dispersion solutions prepared in Examples 1 to 5 and Comparative Examples 1 to 3 were respectively applied to the sputtered surface of a glass substrate (support), on which a 200-nm-thick layer made of carbon was formed by sputtering, by a spin coating method. The coating amounts were each made to be 0.4 g/m².

After coated, each glass substrate was subjected to annealing treatment performed in an electric furnace (500° C., 30 minutes) to produce a magnetic recording medium (thickness of the magnetic layer: 40 nm). The glass substrate to which the nanoparticle dispersion solution prepared in Example 1-5 was separately applied was subjected to annealing treatment performed at 250° C. for 30 minutes to produce a magnetic recording medium.

The coercive force (Hc) of each of the produced magnetic recording media was measured using a high-sensitive magnetization vector measuring device and a DATA processor manufactured by Toei Industry Co., Ltd. in the condition of an applied magnetic field of 790 kA/m (10 kOe).

The results are shown in Table 1.

TABLE 1

|  | Annealing temperature | Coercive force (Hc) |
|---|---|---|
| Example 1-1 | 500° C. | 442.4 kA/m (5600 (Oe)) |
| Example 1-2 | 500° C. | 402.9 kA/m (5100 (Oe)) |
| Example 1-3 | 500° C. | 387.1 kA/m (4900 (Oe)) |
| Example 1-4 | 500° C. | 276.5 kA/m (3500 (Oe)) |
| Example 1-5 | 250° C. | 308.1 kA/m (3900 (Oe)) |
|  | 500° C. | 371.3 kA/m (4700 (Oe)) |
| Comparative Example 1-1 | 500° C. | 14.22 kA/m (180 (Oe)) |
| Comparative Example 1-2 | 50° C. | 45.82 kA/m (580 (Oe)) |
| Comparative Example 1-3 | 500° C. | 86.9 kA/m (1100 (Oe)) |

As is clear from Table 1, it was confirmed that the metal nanoparticle (Examples 1-1 to 1-5) of the invention had a high coercive force even if it was heat-treated in a coated state.

As aforementioned, the invention can provide nanoparticles which are scarcely coagulated with each other and have superior coatability and of which the size and composition can be controlled and a method of producing the nanoparticles. Also, the invention can provide a magnetic recording medium exhibiting hard magnetism by compounding a nanoparticle in a magnetic layer.

Examples According to the Second Embodiment of the Invention:

Example 2-1

The following operations were carried out in high purity $N_2$ gas.

An alkane solution obtained by dissolving 10.8 g of Aerosol OT in 80 ml of decane was added to and mixed with an aqueous metal salt solution obtained by dissolving 0.35 g of triammonium iron trioxalate $(Fe(NH_4)_3(C_2O_4)_3)$ (manufactured by Wako Pure Chemical Industries, Ltd.) and 0.35 g of potassium chloroplatinate $(K_2PtCl_4)$ (manufactured by Wako Pure Chemical Industries, ltd.) in 24 ml of water (deoxidized) to prepare an reverse micelle solution $(I_a)$.

An alkane solution obtained by dissolving 5.4 g of Aerosol OT (manufactured by Wako Pure Chemical Industries, Ltd.) and 2 ml of oleylamine (manufactured by Tokyo Kasei Kogyo Co., Ltd.) in 40 ml of decane (manufactured by Wako Pure Chemical Industries, Ltd.) was added to and mixed with an aqueous reducing agent solution obtained by dissolving 0.57 g of $NaBH_4$ (manufactured by Wako Pure Chemical Industries, Ltd.) in 12 ml of $H_2O$ (deoxidized) to prepare an reverse micelle solution $(II_a)$.

An alkane solution obtained by dissolving 2.7 g of Aerosol OT in 20 ml of decane was added to and mixed with an aqueous metal salt solution obtained by dissolving 0.07 g of copper chloride $(CuCl_2.6H_2O)$ (manufactured by Wako Pure Chemical Industries, Ltd.) in 2 ml of $H_2O$ (deoxidized) to prepare an reverse micelle solution $(I_b)$.

An alkane solution obtained by dissolving 5.4 g of Aerosol OT (manufactured by Wako Pure Chemical Industries, Ltd.) in 40 ml of decane (manufactured by Wako Pure Chemical Industries, Ltd.) was added to and mixed with an aqueous reducing agent solution obtained by dissolving 0.88 g of ascorbic acid (manufactured by Wako Pure Chemical Industries, Ltd.) in 12 ml of water (deoxidized) to prepare an reverse micelle solution $(II_b)$.

The reverse micelle solution $(II_a)$ was added in an instant to the reverse micelle solution $(I_a)$ with stirring the reverse micelle solution $(I_a)$ at a high rate at 22° C. by using an Omni Mixer (manufactured by Yamato Scientific Co., Ltd.). After 3 minutes, the reverse micelle solution $(I_b)$ was further added over about 10 minutes at a rate of about 2.4 ml/min. The siring was changed to one using a magnetic stirrer 5 minutes after the addition was finished and the mixture was raised to 40° C. Then, the reverse micelle solution $(II_b)$ was added and the mixture was matured for 120 minutes.

After the mixture was cooled to ambient temperature, 2 ml of oleic acid (manufactured by Wako Pure Chemical Industries, Ltd.) was added to and mixed with the mixture, which was then taken out in the atmosphere. In order to destroy reverse micelles, a mixed solution consisting of 200 ml of $H_2O$ and 200 ml of methanol was added to the mixture to separate a water phase from an oil phase. Such a state that metal nanoparticles were dispersed was obtained in the oil phase side. The oil phase side was washed with a mixed solution consisting of 600 ml of $H_2O$ and 200 ml of methanol five times. Thereafter, 1300 ml of methanol was added to the resulting solution to cause flocculation of the metal nanoparticles to thereby precipitate. The supernatant was removed and 20 ml of heptane (manufactured by Wako Pure Chemical Industries, Ltd.) was added to redisperse. Further, the precipitating operation performed by the addition of 100 ml of methanol and the dispersing operation using 20 ml of heptane were repeated twice and finally, 5 ml of octane (manufactured by Wako Pure Chemical Industries, Ltd.) was added to the resulting solution to prepare a FeCuPt nanoparticle dispersion solution.

Example 2-2

A FeInPt nanoparticle dispersion solution was obtained in the same manner as in Example 2-1 except that the metal salt in the reverse micelle solution ($I_b$) was altered to 0.07 g of $InCl_3$ (manufactured by Wako Pure Chemical Industries, Ltd.) in Example 2-1.

Example 2-3

A FePbPt nanoparticle dispersion solution was obtained in the same manner as in Example 2-1 except that the metal salt in the reverse micelle solution ($I_b$) was altered to 0.08 g of $PbCl_2$ (manufactured by Wako Pure Chemical Industries, Ltd.) in Example 2-1.

Example 2-4

A CoBiPt nanoparticle dispersion solution was obtained in the same manner as in Example 2-1 except that the metal salts used in the reverse micelle solutions ($I_a$) and ($I_b$) were altered to the following ones in Example 2-1.

Metal salt in the reverse micelle solution ($I_a$): 0.20 g of cobalt chloride ($CoCl_2 \cdot 6H_2O$) and 0.35 g of potassium chloroplatinate ($K_2PtCl_4$) (manufactured by Wako Pure Chemical Industries, Ltd.)

Metal salt of the reverse micelle solution ($I_b$): 0.41 g of bismuth nitrate ($Bi(NO_3)_3 \cdot 5H_2O$)

Example 2-5

The following operations were carried out in high purity $N_2$ gas.

An alkane solution obtained by dissolving 10.8 g of Aerosol OT in 80 ml of decane was added to and mixed with an aqueous metal salt solution obtained by dissolving 0.18 g of triammonium iron trioxalate ($Fe(NH_4)_3(C_2O_4)_3$) (manufactured by Wako Pure Chemical Industries. Ltd.) and 0.35 g of potassium chloroplatinate ($K_2PtCl_4$) (manufactured by Wako Pure Chemical Industries, Ltd.) in 24 ml of $H_2O$ (deoxidized) to prepare an reverse micelle solution ($I_a$).

An alkane solution obtained by dissolving 2.7 g of Aerosol OT in 20 ml of decane was added to and mixed with an aqueous metal salt solution obtained by dissolving 0.10 g of cobalt chloride ($CoCl_2 \cdot 6H_2O$) (manufactured by Wako Pure Chemical Industries, Ltd.) in 2 ml of $H_2O$ (deoxidized) to prepare an reverse micelle solution ($I_b$).

An alkane solution obtained by dissolving 5.4 g of Aerosol OT (manufactured by Wako Pure Chemical Industries, Ltd.) and 2 ml of oleylamine (manufactured by Tokyo Kasei Kogyo Co., Ltd.) in 40 ml of decane (manufactured by Wako Pure Chemical Industries, Ltd.) was added to and mixed with an aqueous reducing agent solution obtained by dissolving 0.57 g of $NaBH_4$ (manufactured by Wako Pure Chemical Industries, Ltd.) in 12 ml of $H_2O$ (deoxidized) to prepare an reverse micelle solution ($II_a$).

An alkane solution obtained by dissolving 2.7 g of Aerosol OT in 20 ml of decane was added to and mixed with an aqueous metal salt solution obtained by dissolving 0.06 g of copper acetate ($Cu(CH_3COO)_2 \cdot H_2O$) (manufactured by Wako Pure Chemical Industries, Ltd.) in 2 ml of $H_2O$ (deoxidized) to prepare an reverse micelle solution ($I_c$).

An alkane solution obtained by dissolving 5.4 g of Aerosol OT (manufactured by Wako Pure Chemical Industries, Ltd.) in 40 ml of decane (manufactured by Wako Pure Chemical Industries, Ltd.) was added to and mixed with an aqueous reducing agent solution obtained by dissolving 0.88 g of ascorbic acid (manufactured by Wako Pure Chemical Industries, lid.) in 12 ml of $H_2O$ (deoxidized) to prepare an reverse micelle solution ($II_b$).

The reverse micelle solution ($I_b$) was added in an instant to the reverse micelle solution (I) with stirring the reverse micelle solution (I) at a high rate at 22° C. by using an Omni Mixer (manufactured by Yamato Scientific Co., Ltd.). After 2 minutes, the reverse micelle solution ($II_a$) was further added in an instant. After three minutes, the reverse micelle solution ($I_a$) was further added over about 10 minutes at a rate of about 2.4 ml/min. The stirring was changed to one using a magnetic stirrer 5 minutes after the addition was finished and the mixture was raised to 40° C. Then, the reverse micelle solution ($II_b$) was added and the m e was matured for 120 minutes.

The same washing and refining were carried out in the same manner as in Example 2-1 to obtain a FeCoCuPt nanoparticle dispersion solution.

Example 26

A FeCoInPt nanoparticle dispersion solution was obtained in the same manner as in Example 2-5 except that 0.33 g of a chelating agent (DHEG) was added to each of the reverse micelle solutions ($I_a$) and ($I_b$) and the metal salt of the reverse micelle solution ($I_b$) was altered to 0.07 g of $InCl_3$ (manufactured by Wako Pure Chemical Industries, Ltd.).

Comparative Example 2-1

A FePt nanoparticle dispersion solution was obtained in the same manner as in Example 2-1 except that the reverse micelle solutions ($I_b$) and ($II_b$) were not used, and the reverse micelle solution ($I_a$) was added in an instant to the reverse micelle solution (I) at ambient temperature (25° C.) with stirring the reverse micelle solution (I) by using a magnetic stirrer to cause a reducing reaction and the mixture was matured at the same temperature for 120 minutes.

Comparative Example 2-2

In Example 2-1, the reverse micelle solution ($I_b$) was not used and the reverse micelle solution ($II_a$) was added in an instant to the reverse micelle solution ($I_a$) at 22° C. with stirring the reverse micelle solution ($I_a$) at a high rate using an Omni Mixer (manufactured by Yamato Scientific Co., Ltd.). The stirring was altered to one using a magnetic stirrer after 10 minutes, the mixture was raised to 40° C. and the reverse micelle solution ($II_b$) was then added to the mixture, which was then matured for 120 minutes. The same procedures as in Example 2-1 except for the above procedures were conducted to obtain a FePt nanoparticle dispersion solution.

Comparative Example 2-3

The following procedures were conducted in high purity $N_2$ gas. 0.39 g of platinum acetylacetonate $(Pt(acac)_2)$ (manufactured by Wako Pure Chemical Industries, Ltd.), 0.6 ml of 1,12-dodecandiol (manufactured by Wako Pure Chemical Industries, Ltd.) and 20 ml of dioctyl ether were mixed with each other and the mixture was heated up to 100° C. Thereafter, 0.28 ml of oleic acid, 0.26 ml of oleylamine and 0.25 g of iron acetylacetonate $(Fe(acac)_3)$ were added. The mixture was raised up to 297° C. and then refluxed for 30 minutes.

After the mixture was cooled, 200 ml of methanol was added to cause the metal nanoparticle to flocculate and to precipitate. After the supernatant was removed, 20 ml of heptane was added to the precipitate to redisperse. 100 ml of methanol was added again to precipitate. The dispersion using heptane and the precipitation using methanol were repeated once more and then the nanoparticles were dispersed using 5 ml of octane to obtain a FePt nanoparticle dispersion solution.

The nanoparticles obtained in Examples 2-1 to 2-6 and Comparative Examples 1 to 3 were analyzed to obtain the results shown in Table 2.

In Table 2, the composition and the yield were measured by ICP spectral analysis (inductive coupling high-frequency plasma spectral analysis) after the dispersion solution was evaporated to dryness, organic substances were decomposed using strong sulfuric acid and then the resulting product was dissolved in aqua regia.

The number average particle diameter and the distribution were calculated by measuring particles on a TEM photograph, followed by statistical processing.

The coercive force was measured using a high-sensitive magnetization vector measuring device and a DATA processor manufactured by Toei Industry Co., Ltd. in the condition of an applied magnetic field of 790 kA/m (10 kOe). As the nanoparticles to be subjected to measurement, nanoparticles were used which were obtained after the nanoparticle dispersion solution was evaporated to dryness and then annealed (550° C. or 350° C.) in an Ar mixture gas containing 5% of $H_2$ in an infrared heating furnace (manufactured by ULVAC-RIKO, Inc.).

As is clear from Table 2, a composition close to that of the formulation was obtained in a higher yield in the case of each nanoparticle of Examples 2-1 to 2-6 than in the case of each nanoparticle of Comparative Example 2-1 to 2-3. Also, the nanoparticles of Examples 2-1 to 2-6 were reduced in the coefficient of variation in the distribution of particle diameters, showing that these nanoparticles were monodispersions, and had high coercive force after annealing. Further, the nanoparticles of Examples 2-1 to 2-6 exhibited higher coercive force than those of Comparative Examples 1 to 3 also when performing annealing treatment at low temperature (350° C.).

Each nanoparticle dispersion solution prepared in Examples 2-1 to 2-6 and Comparative Examples 2-1 to 2-3 was applied to a fired Si substrate (a 300-nm-thick $SiO_2$ layer was formed on the surface of Si) by a spin coating method. The amount of each solution to be applied was made to be 0.1 g/m².

After applied, each coated sample was annealed at 350° C. for 30 minutes using Ar +$H_2$ (5%) mixture gas in an infrared heating furnace (manufactured by ULVAC-RIKO, Inc.) to form a magnetic layer on the substrate.

After the annealing treatment, a carbon layer 10 nm in thickness was applied to the surface of the magnetic layer by a sputtering apparatus (manufactured by Shibaura Mechatronics Corporation) and a lubricant (FOMBLIN, manufactured by AUSIMONT was applied to the carbon layer in a thickness of about 5 nm by a spin coating method to make a magnetic recording medium.

The magnetic characteristics of each sample were evaluated As a result, each of Comparative-Examples 2-1 to 2-3 exhibited no hard magnetism whereas each of Examples 2-1 to 2-6 had a coercive force of 318.3 KA/m (4000 Oe) or more, exhibiting hard magnetism Also, the nanoparticles of each of Examples 2-1 to 2-6 were not fused among them by an annealing treatment but maintained the particle diameter which each had before the annealing treatment.

As aforementioned, the method of producing a nanoparticle according to the present invention can produce a nanoparticle which has a low transformation temperature, is

TABLE 2

|  | Elemental structure of nanoparticles | Composition ratio of nanoparticles (at. %) | Yield (%) | Number average particle diameter (nm) | Coefficient of variation (%) | Coercive force after annealed at 55° C. (KA/m) | Coercive force after annealed at 35° C. (KA/m) |
|---|---|---|---|---|---|---|---|
| Example 2-1 | Fe/Cu/Pt | 42/16/42 | 80 | 5.1 | 5 | 501.4 | 397.9 |
| Example 2-2 | Fe/In/Pt | 44/14/42 | 83 | 5.5 | 5 | 541.2 | 437.7 |
| Example 2-3 | Fe/Pb/Pt | 40/17/43 | 79 | 5.4 | 6 | 477.5 | 390.0 |
| Example 2-4 | Ce/Bi/Pt | 43/15/42 | 82 | 5.0 | 7 | 461.6 | 358.1 |
| Example 2-5 | Fe/Co/Cu/Pt | 20/22/15/43 | 80 | 5.2 | 6 | 525.3 | 405.9 |
| Example 2-6 | Fe/Co/In/Pt | 21/20/16/43 | 82 | 5.5 | 6 | 557.1 | 421.8 |
| Comparative Example 2-1 | Fe/Pt | 75/25 | 26 | 4.1 | 31 | 62.1 | 4.0 |
| Comparative Example 2-2 | Fe/Pt | 51/49 | 80 | 5.0 | 6 | 549.1 | 15.9 |
| Comparative Example 2-3 | Fe/Pt | 57/43 | 58 | 4.9 | 26 | 310.4 | 5.6 | scarcely coagulated, has high coatability, possesses a controllable size and composition and can develop ferromagnetism in a high yield.

What is claimed is:

1. A method of producing a nanoparticle, the method comprising:
   a reducing step of adding a reverse micelle solution (II) obtained by mixing a water-insoluble organic solvent containing a surfactant with an aqueous metal salt solution to a reverse micelle solution (I) obtained by mixing a water-insoluble organic solvent containing a surfactant with an aqueous reducing agent solution, to carry out a reducing reaction; and
   a maturing step of raising the temperature of the reduced mixture of micelle solutions (I) and (II) to mature the reduced mixture after the reducing reaction is completed, wherein
   the ratio (water/surfactant) by mass of water to the surfactant in each of the reverse micelle solutions (I) and (II) is 20 or less;
   the reducing reaction temperature is constant in a range from −5 to 30° C.; and
   the maturing temperature is higher than the reducing reaction temperature and is constant in a range from 30 to 90° C., and the maturing time is 5 to 180 minutes, wherein the nanoparticle forms a CuAu type or $Cu_3Au$ type hard magnetic regular alloy.

2. The method of producing a nanoparticle of claim 1, the method further comprising a step of washing the matured solution with a mixed solution of water and a primary alcohol after the maturing step is completed and a step of carrying out precipitating treatment by using a primary alcohol to produce a precipitate and dispersing the precipitate by using an organic solvent.

3. The method of producing a nanoparticle of claim 1, wherein at least one dispersant having 1 to 3 amino groups or carboxyl groups is added to at least one of the reverse micelle solutions (I) and (II) in an amount of 0.001 to 10 mol per one mol of the metal nanoparticle intended to be produced.

4. The method of producing a nanoparticle of claim 3, wherein the dispersant is an organic compound having at least 1 to 3 amino groups, carboxy groups, sulfonic acid groups or sulfinic acid groups.

5. The method of producing a nanoparticle of claim 3, wherein the dispersant is oleic acid.

6. The method of producing a nanoparticle of claim 1, wherein the water-insoluble organic solvent is an alkane or an ether.

7. The method of producing a nanoparticle of claim 1, wherein the reducing agent in the aqueous reducing agent solution is an alcohol, a polyalcohol, or a compound containing at least one of $H_2$, HCHO, $S_2O_6^{2-}$, $H_2PO_2^-$, $BH_4^-$, $N_2H_5^+$ and $H_2PO_3^-$.

8. The method of producing a nanoparticle of claim 1, wherein the amount of the reducing agent in the aqueous reducing agent solution is 3 to 50 mol based on one mol of the metal salt.

9. The method of producing a nanoparticle of claim 1, wherein the ratio (water/surfactant) by mass of water to the surfactant in each of the reverse micelle solutions (I) and (II) is 15 or less.

10. The method of producing a nanoparticle of claim 1, wherein the ratio (water/surfactant) by mass of water to the surfactant in each of the reverse micelle solutions (I) and (II) is in a range from 0.5 to 10.

11. The method of producing a nanoparticle of claim 1, wherein the coercive force of the nanoparticle after undergoing annealing in the maturing step is in a range from 95.5 to 636.8 kA/m (1200 to 8000 Oe).

12. A method of producing a plural type alloy nanoparticle, the method comprising producing a nanoparticle made of a plural type alloy through a reducing step of mixing one or more reverse micelle solutions (I) containing a metal salt with a reverse micelle solution (II) containing a reducing agent to carry out reducing treatment and a maturing step of carrying out maturing treatment after the reducing treatment, wherein
   at least two metals constituting the plural type alloy are selected from the VIb group and VIII group in the periodic table; and
   at least one metal constituting the plural type alloy is selected from the group consisting of Cu, Ag, B, In, Sn, Pb, P, Sb and Bi and the content of these selected metals is 1 to 30 at. % of all of the plural type alloy, wherein
   the ratio (water/surfactant) by mass of water to a surfactant in each of the reverse micelle solutions (I) and (II) is 20 or less;
   the reducing reaction temperature is constant in the range from −5 to 30° C.;
   the maturing temperature is higher than the reducing reaction temperature and is constant in a range from 30 to 90° C., and the maturing time is 5 to 180 minutes.

13. The method of producing a nanoparticle of claim 12, wherein at least two metals constituting the plural type alloy are FePt, FePd, FeNi, CoPt, CoPd, CoAu, CoCrPt, CoCrPd, FeNiPt or FeCoPt.

* * * * *